United States Patent
Christen et al.

(10) Patent No.: US 7,272,487 B2
(45) Date of Patent: Sep. 18, 2007

(54) METHOD FOR MONITORING COMBUSTION STABILITY OF AN INTERNAL COMBUSTION ENGINE

(75) Inventors: Urs Christen, Aachen (DE); Paul Moraal, vp vaals (NL); Alain Chevalier, Henri-Chapelle (BE); Katie Vantine, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/457,499

(22) Filed: Jul. 14, 2006

(65) Prior Publication Data
US 2007/0021903 A1    Jan. 25, 2007

(30) Foreign Application Priority Data

Jul. 14, 2005 (EP) .................... 05106475
Jul. 14, 2005 (EP) .................... 05106476

(51) Int. Cl.
*G06G 7/70* (2006.01)
*F02M 25/07* (2006.01)
*F02B 47/08* (2006.01)

(52) U.S. Cl. .................... 701/108; 701/111; 123/435; 123/568.21

(58) Field of Classification Search ............... 701/101, 701/108, 111, 112, 113, 114; 123/435, 568.21, 123/568.11; 73/35, 117.1, 117.2
See application file for complete search history.

(56) References Cited

U.S. PATENT DOCUMENTS

| 5,689,065 A | * | 11/1997 | Kuroda et al. ............. 73/117.3 |
| 6,390,054 B1 | | 5/2002 | Yang |
| 6,508,229 B2 | | 1/2003 | Miyakubo et al. |
| 2004/0103860 A1 | | 6/2004 | zur Loye et al. |

FOREIGN PATENT DOCUMENTS

EP    0905361    8/2004

* cited by examiner

*Primary Examiner*—Willis R. Wolfe
*Assistant Examiner*—Johnny H. Hoang
(74) *Attorney, Agent, or Firm*—Julia Voutyras; Allan J. Lippa

(57) ABSTRACT

The present invention relates to a method for monitoring combustion stability of an HCCI internal combustion engine equipped with a crankshaft, an intake manifold and at least one cylinder, wherein stability is determined based on a deviation of an engine operating parameter such as, for example engine load or engine speed, from a predetermined threshold.

6 Claims, 2 Drawing Sheets

METHOD FOR MONITORING COMBUSTION STABILITY OF AN INTERNAL COMBUSTION ENGINE

FIELD OF INVENTION

The present invention relates to a method for monitoring combustion stability of an internal combustion engine provided with a crankshaft, an intake manifold and at least one cylinder, and in particular for monitoring combustion stability of an engine operating on the basis of homogeneous charge compression ignition (HCCI).

BACKGROUND AND SUMMARY OF THE INVENTION

Traditionally, there have been two different engine types, namely diesel and gasoline engines. Both engines operate with different combustion processes which are different in particular in controlling the start of combustion (SOC). While diesel engines control SOC by the timing of fuel injection, in a gasoline engine, i.e., spark-ignited engine, the SOC is controlled by the spark timing. As a result both combustion processes have different characteristics.

Spark-ignited engines are characterized by low $NO_x$ and particulate emissions in comparison to diesel engines. Due to the externally-supplied ignition of a premixed charge forming a nearly homogeneous air fuel mixture which tends to be either lean or close to stoichiometric very low particulate emissions could be achieved taking into account that soot is formed under deficient air, preferably by an air/fuel ratio $\lambda \leq 0.7$. In addition the lower combustion temperatures of the gasoline engine process leads to significantly lower $NO_x$ emissions.

On the other hand the major advantage that diesel engines have over spark-ignited engines is higher thermal efficiency coming from the higher compression ratios which must not be limited as known from gasoline engines wherein compression ratio is restricted in order to avoid knocking, i.e., auto-ignition in some areas of the premixed charge. Another reason for the mentioned higher efficiency of diesel engines is caused by the fact that engine load is controlled by fuel quantity and not by a throttle resulting in thermodynamic losses, in particular during the gas exchange.

However, diesel engines produce higher $NO_x$— and particulate emissions. Due to the mixing controlled nature of diesel combustion a more or less large fraction of the injected fuel is not sufficiently mixed with the combustion air resulting in an inhomogeneous charge which is in some areas rich, thus leading to particulate emissions. The combustion starts by auto-ignition when the mixture reaches a certain temperature, namely in charge areas where the air/fuel ratio is nearly stoichiometric resulting in high process temperatures.

In the past, the injection of fuel directly into the combustion chamber was a feature solely applied to diesel engines. Since the first direct injection gasoline engines are brought into the market, injecting fuel directly into the combustion chamber is not longer restricted to diesel engines.

However, it is believed that modern hybrid combustion processes have to be developed and improved in order to meet future U.S. and European emission regulations. Such hybrid processes combine technical features which are traditionally assigned to diesel and gasoline engines or make use of different combustion principles depending on the actual engine operating conditions, in particular engine load and engine speed.

An example for a so-called hybrid process is the homogeneous charge compression ignition (HCCI) which could be applied with some differences to both, diesel and gasoline engines. Sometimes this combustion principle is denoted as premixed charge compression ignition (PCCI). Hereinafter both are collectively referred to as HCCI or low temperature combustion (LTC).

The HCCI combustion process is based on auto-ignition of a relatively well premixed fuel/air mixture which occurs when the mixture reaches a certain temperature. As pointed out in EP 0 905 361 B1 experiments have revealed that the one important condition for effectively realizing low temperature combustion is to terminate fuel injection during the ignition delay period, i.e., the ignition delay period has to be longer than the fuel injection period in which fuel is injected. While auto-ignition is well known from conventional diesel engines, the fuel and air are mixed, in the intake port or the combustion chamber, long before ignition occurs in such a way, that the extent of the premixture preferably reaches a homogeneous or nearly homogeneous state. The latter is typical for conventional gasoline engines. Because of the well premixed nearly homogeneous charge auto-ignition starts—preferably simultaneously—in the whole charge, i.e., in many areas throughout the combustion chamber. In contrary to this the mixture process of a conventional diesel engine is often injection controlled, so that the conditions for auto-ignition exist only in some or one area from which combustion disperses.

All in all, HCCI combustion is characterized in that combustion is initiated by compression ignition and in that a nearly homogeneous air/fuel mixture is formed before combustion starts, i.e., fuel injection is terminated before auto-ignition occurs.

As mentioned above and according to the state of the art HCCI is restricted to specific operating conditions and cannot be applied throughout the entire engine operation map. The limitations of HCCI—engines relate to controlling the ignition timing and the combustion rate at different operating conditions. This is because combustion starts by auto-ignition when the required conditions for auto-ignition are present in the premixed charge. Engine load and engine speed substantially influence ignition timing and the combustion rate. For these reasons, application of HCCI technology for an automotive engine which requires a wide range of operating conditions requires either measures for expanding the areas of application or the combination with other combustion principles.

U.S. Pat. No. 6,390,054 B1 relates to an engine control strategy for a hybrid homogeneous charge compression ignition (HCCI) and spark ignition engine, and more particularly to a strategy for combustion mode transition between HCCI and SI engine operation.

U.S. Pat. No. 6,390,054 B1 deals with the critical aspects concerning the application of HCCI in spark-ignited engines and addresses the underlying problem that ignition timing and combustion rate are more or less influenced by the operating conditions, i.e., by engine load and engine speed. Because the air/fuel mixture is formed before start of combustion (SOC) and earlier before top dead centre (TDC) auto-ignition can occur at any time during the compression process.

Thus, as the engine load increases, the ignition tends to advance, and the combustion rate tends to increase due to richer mixture. The thermal efficiency may also decrease due to the early heat release before TDC, and the engine becomes rough due to fast and early combustion. When the engine load decreases, the ignition tends to be retarded which may eventually result in misfiring al well as an increase in HC and CO emissions. When the engine speed increases, the time for the main heat release tends to be retarded since the time available for low temperature preliminary reaction of the diluted mixture becomes insufficient and misfiring may occur.

Because HCCI engine operation is directly related to the intake air charge temperature, U.S. Pat. No. 6,390,054 B1 suggests equipping the engine with several systems/devices for controlling the intake air charge temperature. These systems include an exhaust gas recirculation EGR and/or a heat exchanger or the like.

By decreasing the air charge temperature the HCCI operating range can be extended to higher loads due to the fact that when charge temperature is decreased, the ignition tends to be retarded. In other words, the ignition delay can be raised by cooling the air fed to the cylinders. This can be done by reducing the internal exhaust gas recirculation, by controlling the coolant temperature, by retarding the intake valve closing time to reduce the effective compression ratio, by using cooled external exhaust gas recirculation, or by supercharging with an intercooler.

Conversely, the performance of HCCI operation can be improved under lower part load by increasing the charge temperature, i.e., by heating the intake air or using more exhaust gas recirculation or by using engine coolant control. The same measures can be used to improve the behavior during high engine speed operation.

The prior discussion shows that it is essential to monitor and supervise the combustion, i.e., the combustion stability, in particular to take measures if misfiring or the like occurs.

US 2004/0103860 A1 also relates to an optimized combustion control for a premixed charge compression ignition engine. The suggested control strategy aims to maintain a stable, efficient HCCI combustion with low emissions by controlling the time at which combustion occurs (SOC), the duration of combustion and the rate of combustion. The control is outlined in detail, i.e., control start of combustion to the interval [−20, 10] ° CA, preferably to [−10, 5] ° CA; and control combustion duration to 5-30° CA (crank angle). This is achieved for example by controlling the temperature of the fresh cylinder charge, for instance by controlling the temperature of the intake air or by controlling the cylinder charge temperature.

In addition or alternatively intake manifold pressure, in-cylinder pressure or air/fuel ratio may be controlled to influence start of combustion and combustion duration.

U.S. 2004/0103860 A1 also discloses that start of combustion and combustion duration can be influenced and controlled by fuel properties. According to U.S. 2004/0103860 A1 a control system is formed by using two fuels with different properties which are mixed online in order to vary auto-ignition properties. Therefore the first fuel has a first auto-ignition property and the second fuel has a second auto-ignition property different from first auto-ignition property.

On the one hand low temperature combustion (LTC) is sensitive to changes in engine operating conditions as discussed above. On the other hand the last mentioned technical teaching about influencing the combustion by varying fuel properties underlines how sensitive low temperature combustion (LTC) is also to changes in the boundary conditions, such as coolant water temperature, fuel quality, or the like.

EP 0 905 361 B1 relates to improvements in a combustion control system for a diesel engine and also addresses the importance of fuel properties with respect to low temperature combustion. It is pointed out that the ignition delay period and thus the start of combustion can be influenced and controlled by fuel properties, in particular by the cetan number of the used fuel. One problem to be solved is to prevent the start of combustion while fuel is injected.

However, one conclusion which can be drawn from the control systems well known in the state of the art and described above is that combustion stability has to be monitored to avoid rough engine operation, misfiring, or other undesired changes in combustion during steady-state operation.

Combustion stability is usually defined as the ratio of $p_{ind}$ standard deviation on mean $p_{ind}$, wherein $p_{ind}$ is an abbreviation for indicated mean effective pressure. Alternatively indicated torque ($T_{ind}$) derived from $p_{ind}$ may be used. The equation for combustion stability which is abbreviated as stab is as follows:

$$\text{stab} = \frac{\sigma(p_{ind})}{\mu(p_{ind})} = \frac{\sigma(T_{ind})}{\mu(T_{ind})}$$

Unstable combustion is assumed when stab is greater than 0.05 or in other words: if the standard deviation amounts to 5% or more of the mean value it is expected that such extensive changes in indicated mean effective pressure are caused by combustion stability problems.

U.S. Pat. No. 6,508,229 B2 relates to auto-ignition combustion management in internal combustion engines and uses the above mentioned equation to calculate and express combustion stability.

However, this procedure is impractical for online calculation because it involves statistics, i.e., data which must be acquired and stored over many cycles. Taking into account that steady state is the only engine operation in which monitoring combustion stability makes sense and assumed that, for example, hundred cycles are required to calculate combustion stability said stability calculation has to be abandon when the engine operates only for a short time, i.e., for less than hundred cycles under steady state conditions. In this case calculation is terminated before a result for combustion stability is available. Even if the engine operates long enough under steady state conditions the response time with respect to combustion instability is comparatively extensive because at least hundred cycles are needed.

Moreover, the bookkeeping for this statistics is relatively cumbersome. Several intermediate variables need to be stored and re-initialized each time the calculations need to be abandoned because the engine operation is not sufficiently steady.

With respect to the present invention is directed to a method for monitoring combustion stability of an internal combustion engine provided with a crankshaft, an intake manifold and at least one cylinder, which overcomes the problems described above, in particular a method which is suitable for online calculation.

According to the present invention, a method for monitoring combustion stability of an internal combustion engine equipped with a crankshaft, an intake manifold and at least one cylinder is provided, includes: determining the absolute deviation e of indicated mean effective pressure $p_{ind}$ or indicated torque $T_{ind}$ with respect to actual indicated mean effective pressure set point $p_{ind,setpt}$ or actual indicated torque set point $T_{ind,setpt}$, namely $\Delta p_{ind}$ or $\Delta T_{ind}$, or alternatively determining the relative change $\Delta e$ in said deviation between two consecutive combustion cycles k, k+1 of said at least one cylinder, i.e., determining $(\Delta p_{ind,k+1} - \Delta p_{ind,k})$ or ($\Delta T_{ind,k+1} - \Delta T_{ind,k}$) or determining the relative change $\Delta e$ in angular acceleration $\omega'$ of the crankshaft between two consecutive combustion cycles k, k+1, i.e., ($\Delta\omega'_{k+1} - \Delta\omega'_k$), and comparing said determinated deviation e or said change $\Delta e$ with a predetermined engine operating point dependent threshold $e_{threshold}$ or $\Delta e_{threshold}$ in order to decide if the combustion is stable or not by means of the following inequalities: $|e| > e_{threshold}$ or $|\Delta e| > \Delta e_{threshold}$ means combustion is not stable, $|e| \leq e_{threshold}$ or $|\Delta e| \leq \Delta e_{threshold}$ means combustion is stable.

The set point for indicated torque, $T_{ind,setpt}$, may be computed from the accelerator pedal position ($\alpha_{ped}$), the torque losses and, if necessary, additional signals like engine speed, gear and the like. For instance, within a feed forward path said torque set point, $T_{ind,setpt}$, is first converted into fuel quantity ($w_f$) which is then converted into the injection duration ($t_{pulse}$), i.e., the time during which the injector nozzle needs to be open. The set point for indicated mean effective pressure, $p_{ind,set}$, can be derived from torque set point $T_{ind,setpt}$.

Because the crankshaft is subjected to rotary oscillations also during steady state engine operation due to the changing in-cylinder pressure and inertia of the crank drive components a set point for the angular acceleration $\omega'_{setpt}$ can not be constructed. For this reason the first alternative according to the inventive method can not be applied when using angular acceleration $\omega'$.

The in-cylinder pressure $p_{cyl}$ created by burning the fuel injected is measured and used for calculating actual indicated torque $T_{ind}$. To this end, indicated mean effective pressure $p_{ind}$ is calculated as the integral of pressure times change in cylinder volume over the whole cycle:

$$P_{ind,full} = \frac{1}{V_d} \int_0^{720} p(\theta) \frac{d}{d\theta} V(\theta) d\theta$$

where $\theta$ is the crank angle and $V_d$ the engine displacement. Often, the integration interval is restricted to the high-pressure part, i.e., to the compression and expansion strokes:

$$P_{ind,hp} = \frac{1}{V_d} \int_{360}^{720} p(\theta) \frac{d}{d\theta} V(\theta) d\theta$$

Other integration intervals are also possible, e.g., from intake valve closure to exhaust valve opening.

Indicated torque $T_{ind}$ (Nm) is derived from the $p_{ind}$:

$$T_{ind} = 10^5 \frac{V_d}{4\pi} P_{ind}$$

This is the torque produced by the in-cylinder pressure $p_{cyl}$.

Angular acceleration $\Delta\omega'$ of the crankshaft can be obtained by means of a crankshaft position sensor which is already disposed on engines in order to provide the engine control unit (ECU) with data required to determine the crankshaft position, i.e., the crank angle.

If the set point and the current value of the used parameter—$p_{ind}$ or $T_{ind}$—are calculated said absolute deviation e of indicated pressure, $p_{ind}$, or indicated torque, $T_{ind}$, with respect to the set point simply can be generated by subtraction:

$$e = \Delta p_{ind} = p_{ind} - p_{ind,setpt}$$

or $$e = \Delta T_{ind} = T_{ind} - T_{ind,setpt}$$

For modern torque-based engine control strategies, it is important to ensure that indicated torque $T_{ind}$ is consistent, especially for future, more stringent emissions standards. Indicated torque $T_{ind}$ derived from in-cylinder pressure $p_{cyl}$ measurements can be used for feedback control, i.e., indicated torque $T_{ind}$ is controlled to the set point $T_{ind,setpt}$ via feedback control, i.e., by closing the loop by means of a feedback path, in order to adjust said actual indicated torque $T_{ind}$ by controlling $\Delta T_{ind}$ to zero. As shown, with feedback control, $\Delta T_{ind}$ has to be calculated anyway. Because of this, the first alternative according to the present inventive method determining the absolute deviation e is preferably applied to modern engines which are equipped with torque control via feedback control.

The second alternative according to the present inventive method which determines the relative change $\Delta e$ in the deviation between two consecutive combustion cycles k, k+1 has the advantage that the setpoints of the used parameter—$p_{ind}$ or $T_{ind}$—are eliminated. This only leaves the two measurements of the actual absolute values of the parameters for the cycles k+1, k. This can be demonstrated with the following equations using indicated mean effective pressure $p_{ind}$:

$$\Delta e = p_{k+1,ind} - p_{k,ind}$$

or $$\Delta e = (p_{k+1,ind,setpt} + \Delta p_{ind,k+1}) - (p_{k,ind,setpt} + \Delta p_{ind,k})$$

or taking into account that the set point is constant under steady state conditions with:

$$p_{k+1,ind,setpt} = p_{k,ind,setpt}$$

the change $\Delta e$ in deviation could be expressed as follows:

$$\Delta e = (\Delta p_{ind,k+1} - \Delta p_{ind,k})$$

The embodiment in question can be applied to engines using feed forward control for torque control, i.e., it is not required to determine the set point of the used parameter, in particular to control indicated torque $T_{ind}$ to the set point $T_{ind,setpt}$ via feedback control. Furthermore the use of the change $\Delta e$ in deviation for monitoring combustion stability allows the application of less cost-intensive pressure sensors. An error in calibration or an offset does not affect the results achieved for $\Delta e$ because such effects are eliminated by subtracting the values of two consecutive cycles.

Because no set point is required for the application of the second alternative method combustion stability can be monitored by determining the relative change $\Delta e$ in angular acceleration $\omega'$ of the crankshaft between two consecutive combustion cycles k, k+1, i.e., ($\Delta\omega'_{k+1} - \Delta\omega'_k$). For this, angular acceleration $\omega'$ is acquired for two consecutive combustion cycles taking into account that for comparison the crankshaft position in both cycles has to be the same.

It has to be mentioned that within the present application steady state always defines engine operating conditions which are constant or change just slightly.

In the following preferred embodiments are discussed according to the dependent claims.

A preferred embodiment of the method is characterized in that said predetermined threshold $e_{threshold}$ or $\Delta e_{threshold}$ is set to 15% or less of the respective set point value, i.e., mean effective pressure set point, $p_{ind,setpt}$, or indicated torque set point, $T_{ind,setpt}$.

A preferred embodiment of the method is characterized in that said predetermined engine operating dependent threshold $e_{threshold}$ or $\Delta e_{threshold}$ is stored in at least one lookup table using at least engine load and engine speed as scheduling variables, so that said threshold is read out from said at least one lookup table by using said scheduling variables as input data.

A preferred embodiment of the method is characterized in that the burnt mass fraction $F_i$ present in the cylinder charge is decreased if combustion is not stable. Due to a decrease in the burnt mass fraction $F_i$ which is equal to an increase in oxygen the combustion delay period is reduced so that ignition takes place earlier. Misfiring can be avoided and the combustion rate also tends to increase.

In case of an internal combustion engine provided with an exhaust gas recirculation system (EGR) a preferred embodiment of the method is characterized in that the exhaust gas mass fed into the intake manifold is decreased in order to decrement said burnt mass fraction $F_i$.

Another possibility for decreasing the burnt mass fraction $F_i$ present in the cylinder charge can be realized by influencing the residual gas mass fraction, i.e., the exhaust gas mass located still in the combustion chamber and which is not evacuated during gas exchange period. This can be achieved by controlling the valve opening and closing time. For this a valve system which is at least partially variable is required.

A preferred embodiment of the method is characterized in that said burnt mass fraction $F_i$ is decremented by a specific value $\Delta F_i$ which is operating point dependent. In this case it is preferred that said specific value $\Delta F_i$ is stored in at least one lookup table using at least one of engine load and engine speed as scheduling variables, so that said value is read out from said at least one lookup table by using said scheduling variables as input data.

While the inventive method is carried out under steady state conditions, each specific engine operation point to deal with differences in engine load and engine speed at least. In addition the exhaust gas mass fed into the intake manifold, apart from other engine parameters, depends on the specific operating point conditions. Because of this it is preferred to choose the extent of the specific value $\Delta F_i$ operating point dependent. Lookup tables are well known and easy to implement into present control systems so that these tables are appropriate for this purpose.

It is preferred to lower the burnt gas mass fraction gradually in order to be sure that an extensive response stabilizes the combustion within one step only and in the expectation that one change is sufficient for combustion stabilization. Thereby the number of misfirings due to an unstable combustion can be lowered.

A preferred embodiment of the method is characterized in that intake air charge temperature $\vartheta_{intake}$ is increased if combustion is not stable. This procedure makes use of the effect described in the introduction, in particular of the effect that combustion can be influenced by changing the charge temperature. By increasing the temperature $\vartheta_{intake}$ combustion is stabilized because ignition tends to advance due to the fact that in the cylinder charges the conditions for auto-ignition, in particular the ignition-temperature, are reached faster rather than when temperatures are low. Intake air charge temperature $\vartheta_{intake}$ also can be increased by bypassing an intercooler if provided. A heat exchanger can also be used to increase the charge temperature. If possible an increase of the compression ratio can be used to generate higher cylinder charge temperatures during compression in order to stabilize the combustion.

A preferred embodiment of the method is characterized in that engine temperature $\vartheta_{eng}$ is increased if combustion is not stable. Instead of or in addition to an increase of the intake air charge temperature $\vartheta_{intake}$ the combustion can be stabilized by increasing the engine temperature $\vartheta_{eng}$ in order to increase cylinder charge temperature. For example, this is achieved by lowering the performance of the engine coolant system in order to lower the heat transfer from the cylinder charge to the cylinder liner and the cylinder head forming the combustion chamber.

A preferred embodiment of the method is characterized in that said temperatures intake and/or $\vartheta_{eng}$ are/is increased by a specific value $\Delta\vartheta_{intake}$ and/or $\Delta\vartheta_{eng}$ which are operating point dependent. It is referred to the above described embodiment dealing with a specific value $\Delta F_i$ for the burnt mass fraction.

A preferred embodiment of the method is characterized in that said specific value $\Delta\vartheta_{intake}$ and/or $\Delta\vartheta_{eng}$ is stored in at least one lookup table using at least one of engine load and engine speed as scheduling variables, so that said specific value is read out from said at least one lookup table by using said scheduling variables as input data. Concerning the use of lookup tables it is referred to the above mentioned.

A preferred embodiment of the method is characterized in that engine operation is supervised for detecting transition from steady state operation to transient operation in order to disable monitoring and/or influencing combustion stability.

It is necessary to supervise engine operation in order to decide if the determined deviation e or change $\Delta e$ in deviation is caused by combustion instability or, on the other hand, transient engine operation is responsible for a change in indicated torque, indicated mean effective pressure and/or angular acceleration.

However, if the incrementing or decrementing value $\Delta\vartheta_{intake}$, $\Delta\vartheta_{eng}$ and/or $\Delta F_i$ is chosen small enough, the error introduced by transient operation is negligible.

BRIEF DESCRIPTION OF DRAWINGS

In the following text, the invention will be described in detail with reference to the attached drawings. These schematic drawings are used for illustration only and do not in any way limit the scope of the invention. In the drawings.

DESCRIPTION OF PREFERRED EMBODIMENT(S)

Figure 1:
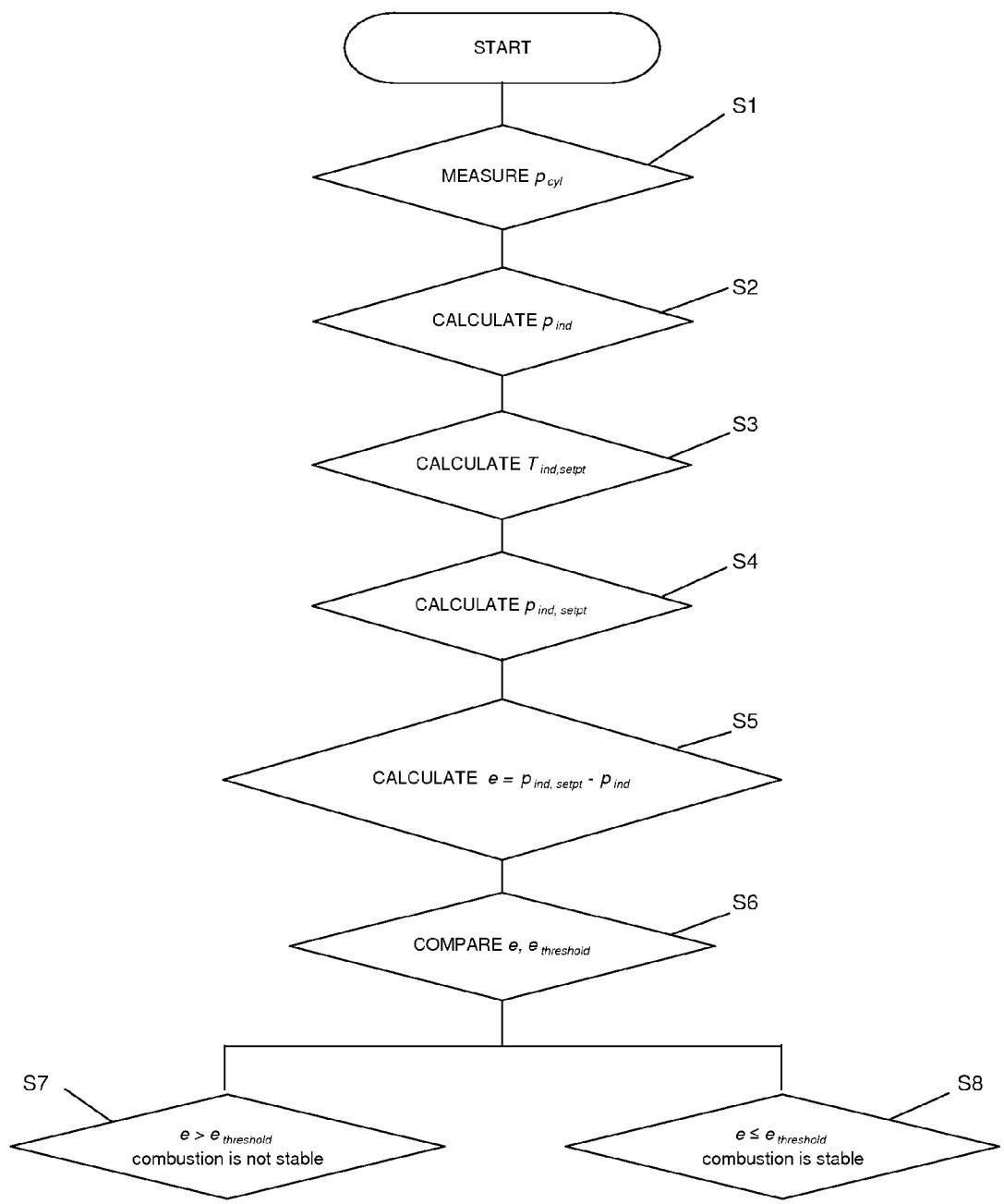
FIG. 1 shows the flow diagram of a first embodiment according to the present invention.

FIG. 1 shows the flow diagram of a first embodiment according to the invention, wherein in a first step S1 in-cylinder pressure $p_{cyl}$ is measured and used for calculating indicated pressure $p_{ind}$ within a second step S2. The torque set point $T_{ind,setpt}$ is determined from the accelerator pedal position ($\alpha_{ped}$), the torque losses and, if necessary, additional signals like engine speed, gear and the like (S3).

The torque set point $T_{ind,sept}$ is used to determine the set point for indicated pressure $p_{ind,setpt}$ in a fourth step S4. For further processing, the deviation e between the set point $p_{ind,setpt}$ and the actual value of the indicated pressure $p_{ind}$ is calculated (S5).

The resulting deviation $e = \Delta p_{ind} = (P_{ind} - p_{ind,setpt})$ is compared with a predetermined deviation threshold $e_{threshold}$ in order to decide whether the combustion is stable or not (S6).

If $$|e| > e_{threshold}$$

it is assumed that the combustion is not stable (S7a) and has to be stabilized by changing operating conditions, i.e., by reducing the burnt mass fraction or increasing the charge temperature directly or indirectly (S7b).

If $$|e| \leq e_{threshold}$$

it is assumed that the combustion is stable and no reaction, i.e., change in operating conditions is required (S8).

Figure 2:
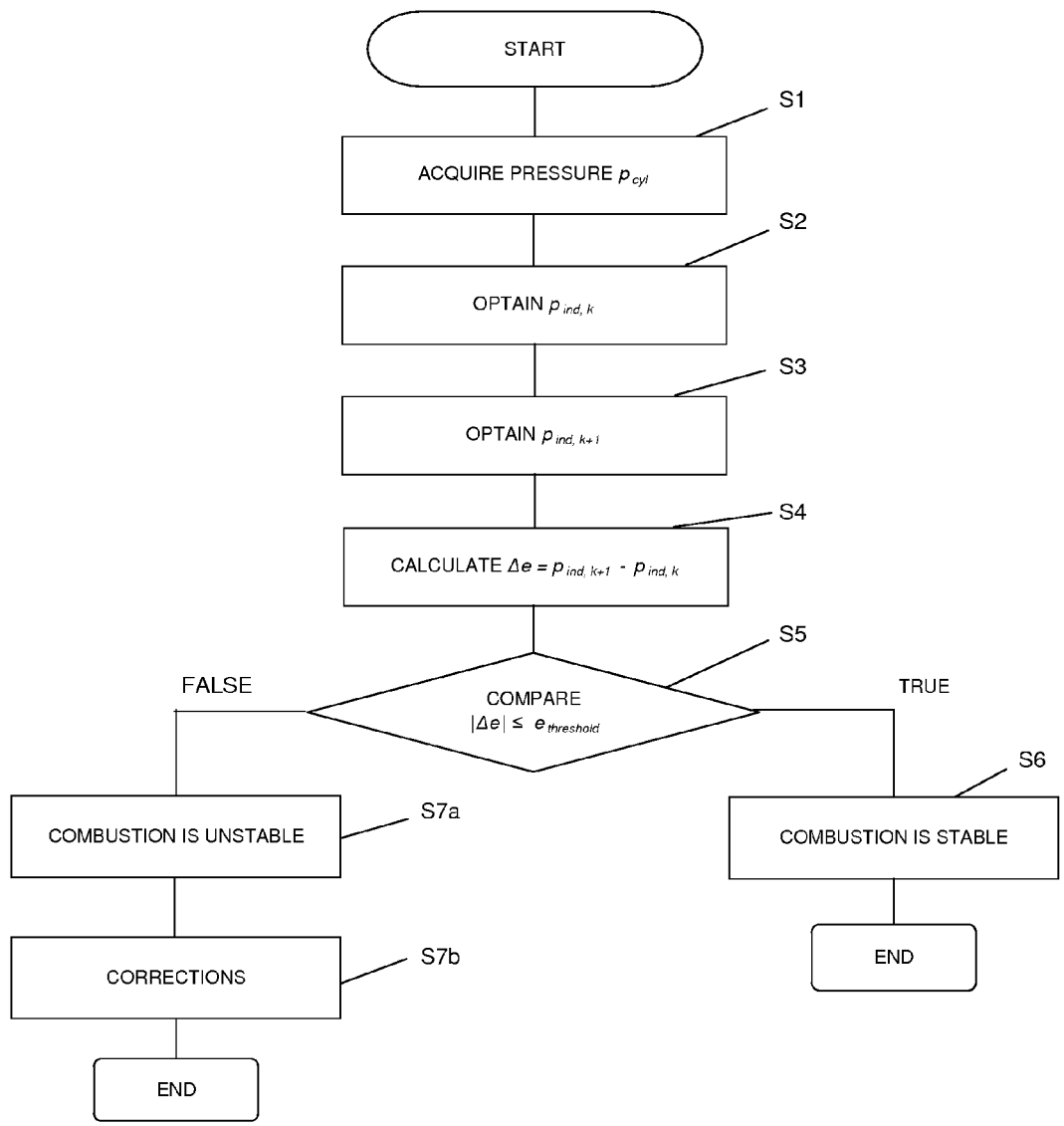
FIG. 2 shows the flow diagram of a second embodiment according to the present invention.

FIG. 2 shows the flow diagram of a second embodiment according to the invention.

Within the first step S1 in-cylinder pressure $p_{cyl}$ is measured for two consecutive cycles k, k+1. The respective pressure traces $p_{cyl,k}(\theta)$ and $p_{cyl,k+1}(\theta)$ are used to calculate the actual value of indicated pressure $p_{ind,k+1}$ and $p_{ind,k}$ for both cycles by integration (S2,S3).

In practice it will be more convenient to measure in-cylinder pressure $p_{cyl}$ once for one specific cycle and to calculate and store the respective indicated mean effective pressure $p_{ind,k}$ for further processing. By doing the same for the consecutive cycle k+1, indicated mean effective pressure is obtained for two consecutive cycles, namely $p_{ind,k}$ and $p_{ind,k+1}$, not by recalculating $p_{ind}$ each time but by storing the previously calculated value for $p_{ind}$ for further processing.

For further processing the change $\Delta e$ in deviation between the two cycles in question is calculated (S4) by using the following equation:

$$\Delta e = (p_{ind,k+1} - p_{ind,k}) = (\Delta p_{ind,k+1} - \Delta p_{ind,k})$$

The result $\Delta e$ is compared with a predetermined threshold $\Delta e_{threshold}$ in order to decide whether the combustion is stable or not (S5).

If $$|\Delta e| > \Delta e_{threshold}$$

it is assumed that the combustion is not stable (S7a) and has to be stabilized by changing operating conditions, i.e., by reducing the burnt mass fraction or increasing the charge temperature directly or indirectly (S7b).

If $$|\Delta e| \leq \Delta e_{threshold}$$

it is assumed that the combustion is stable and no reaction, i.e., change in operating conditions is required (S6).

Reference Signs
$\alpha_{ped}$ accelerator pedal position
CA abbreviation for crank angle
CO carbon monoxides
$\vartheta_{eng}$ engine temperature
ECU engine control unit
EGR exhaust gas recirculation
e deviation between set point and actual value of the used parameter
$e_{threshold}$ threshold with respect to e
$\Delta e$ change in the respective deviation e
$\Delta e_{threshold}$ threshold with respect to $\Delta e$
$F_i$ burnt mass fraction
$\Delta F_i$ change in burnt mass fraction $F_i$ by a specific value
HC unburned hydrocarbons
HCCI homogeneous charge compression ignition
hp high-pressure part
$\theta$ crank angle of the crankshaft
$p_{ind}$ indicated mean effective pressure
k number of an operation cycle
k+1 number of an operation cycle consecutive to cycle k
LTC low temperature combustion
$\lambda$ air/fuel ratio
$\mu(p_{ind})$ mean value of indicated mean effective pressure $p_{ind}$
$\mu(T_{ind})$ mean value of indicated torque $T_{ind}$
$NO_x$ nitrogen oxides
PCCI premixed charge compression ignition
$p_{cyl}$ in cylinder pressure
$p_{ind}$ actual value $p_{ind}$ of indicated pressure
$p_{ind,setpt}$ indicated pressure set point
$\Delta p_{ind}$ deviation between set point $p_{ind,setpt}$ and actual value $p_{ind}$ of indicated pressure
$\sigma(p_{ind})$ standard deviation in indicated mean effective pressure $p_{ind}$
$\sigma(T_{ind})$ standard deviation in indicated torque $T_{ind}$
SOC start of combustion
SOI start of injection
stab combustion stability
$t_{pulse}$ injection duration
T torque demand
$T_{ind}$ actual value $T_{ind}$ of indicated torque
$\Delta T_{ind}$ deviation between set point $T_{ind,setpt}$ and actual value $T_{ind}$ of indicated torque
$T_{ind,setpt}$ indicated torque demand, indicated torque set point
TDC top dead center
$\vartheta_{eng}$ engine temperature
$\Delta \vartheta_{eng}$ change in engine temperature $\vartheta_{eng}$ by a specific value
$\vartheta_{intake}$ intake air charge temperature
$\Delta \vartheta_{intake}$ change in intake air charge temperature $\vartheta_{intake}$ by a specific value
$V_d$ engine displacement
$w_f$ fuel quantity, fuel mass or fuel volume
$\omega$ angular speed
$\omega'$ angular acceleration
$\Delta \omega'$ deviation between set point $\omega'_{setpt}$ and actual value $\omega'$ of angular acceleration This concludes the description of the invention, which is not limited to the above embodiments, but may be varied freely within the scope of the claims.

The invention claimed is:

1. A method for monitoring combustion stability of an internal combustion engine including a crankshaft, an intake manifold and at least one cylinder, and an exhaust gas recirculation system, the method comprising:
calculating an absolute deviation of an engine parameter with respect to its actual set point;
determining combustion stability based on a comparison of said deviation to a predetermined threshold, wherein said predetermined threshold is stored in at least one lookup table using at one of least engine load and engine speed as scheduling variables, so that said threshold is read out from said at least one lookup table by using said scheduling variables as input data; and decreasing an exhaust gas mass fed into the intake manifold when combustion is not stable in order to decrement a burnt mass fraction Fi present in the cylinder charge by a specific value $\Delta Fi$ which is stored in at least one lookup table using at least one of engine load and engine speed as scheduling variables, so that said value is read out from said at least one lookup table by using said scheduling variables as input data.

2. The method according to claim 1 wherein intake air charge temperature is increased if combustion is not stable.

3. The method according to claim 1 wherein engine temperature is increased if combustion is not stable.

4. The method according to claim 1 wherein at least one of said intake air charge temperature and engine temperature is increased by at least one of specific values which is operating point dependent.

5. The method according to claim 3 wherein at least one of said specific values is stored in at least one lookup table using at least one of engine load and engine speed as scheduling variables, so that said specific value is read out from said at least one lookup table by using said scheduling variables as input data.

6. A method according to claim 5 wherein engine operation is supervised for detecting transition from steady state operation to transient operation in order to disable monitoring and/or influencing combustion stability.

* * * * *